United States Patent [19]

Marshall et al.

[11] Patent Number: 5,074,186

[45] Date of Patent: Dec. 24, 1991

[54] ELECTRICALLY ACTUATED MULTIPLE STORE LAUNCHER

[75] Inventors: Frank P. Marshall, Penns Park; Bruce W. Travor, Holland, both of Pa.

[73] Assignee: The United States of America as represented by the Secretary of the Navy, Washington, D.C.

[21] Appl. No.: 605,901

[22] Filed: Oct. 30, 1990

[51] Int. Cl.⁵ ............................................. B64D 1/04
[52] U.S. Cl. .................................................... 89/1.51
[58] Field of Search ...................... 89/1.51, 1.56, 1.57

[56] References Cited

U.S. PATENT DOCUMENTS

| | | | |
|---|---|---|---|
| 3,240,200 | 3/1966 | Jones | 89/1.51 |
| 3,451,306 | 6/1969 | Lagerstrom | 89/1.51 |
| 4,019,421 | 4/1977 | Ström | 89/1.51 |
| 4,026,188 | 5/1977 | Woodruff et al. | 89/1.51 |
| 4,164,887 | 8/1979 | Ouellette | 89/1.51 |
| 4,444,085 | 4/1984 | Dragonuk | 89/1.51 |
| 4,733,597 | 3/1988 | Upham | 89/1.51 |

Primary Examiner—David H. Brown
Attorney, Agent, or Firm—James V. Tura; James B. Bechtel; Susan E. Verona

[57] ABSTRACT

This invention comprises a multi-store, electrical pulse initiated launcher that fits into, and is electrically connected with, a transporting vehicle and that contains sequentially-stacked assemblies. An electrical pulse from the transporting vehicle causes a resistor with the least value to transfer the electric to a gas generating cartridge. The cartridge provides sufficient gas pressure to force the store out of the launcher.

7 Claims, 3 Drawing Sheets

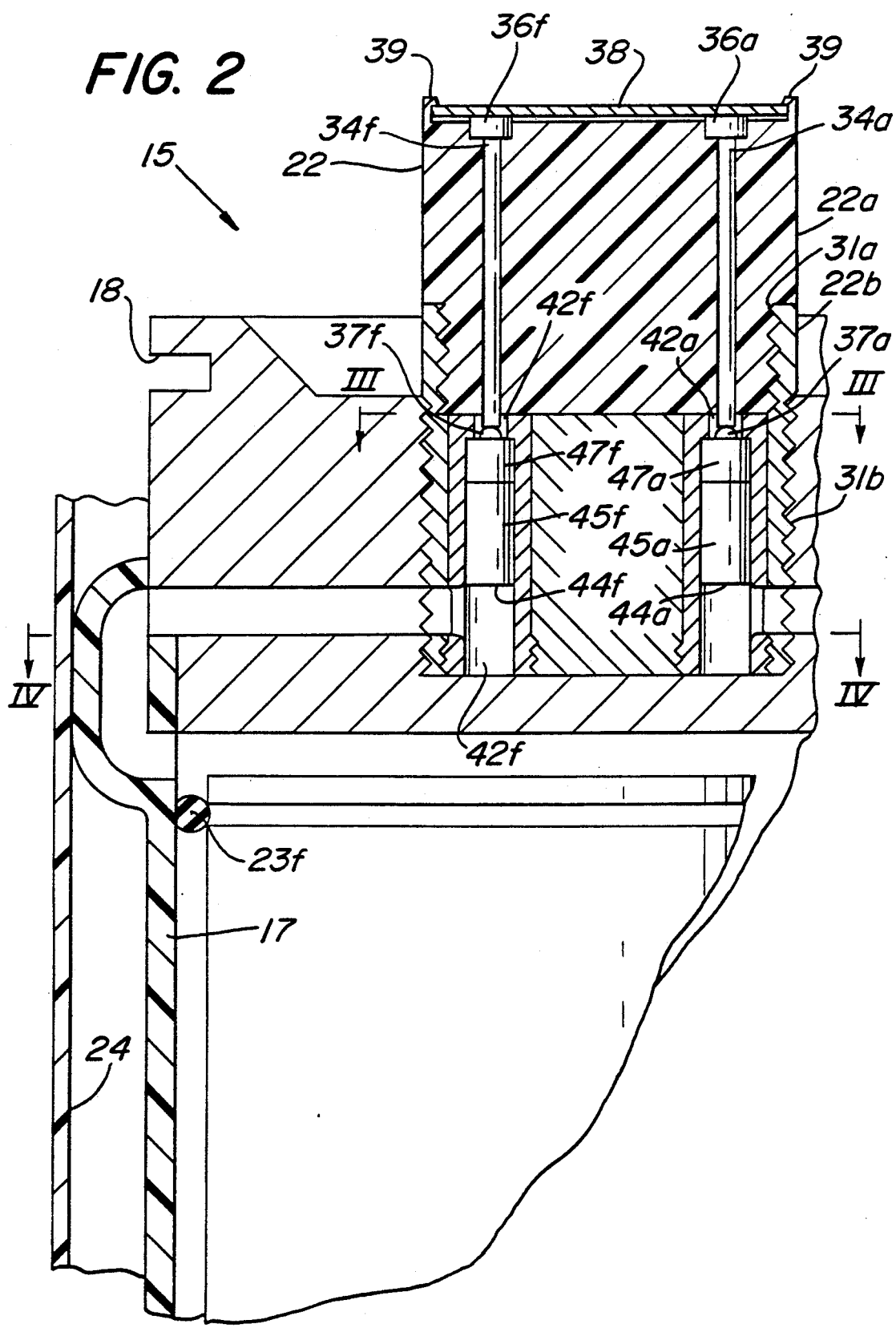

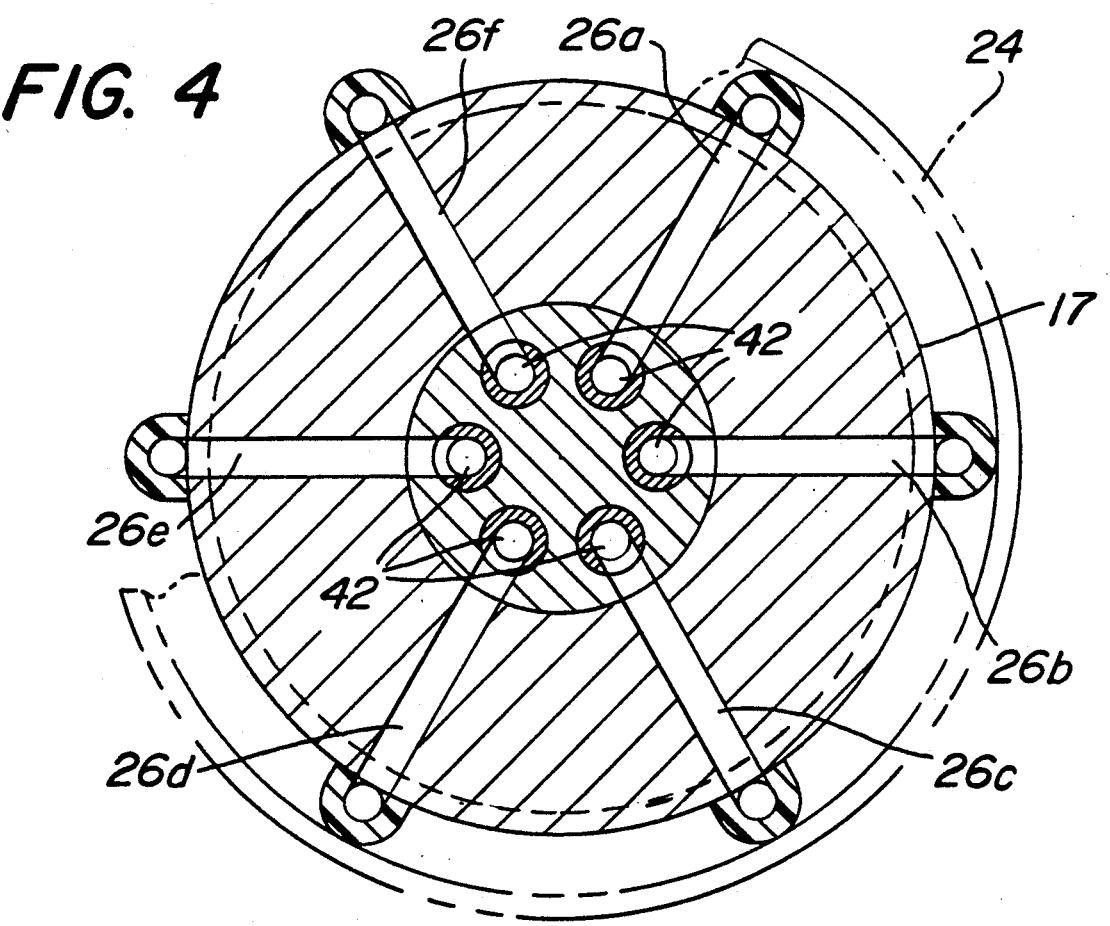

ELECTRICALLY ACTUATED MULTIPLE STORE LAUNCHER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention discloses an electrically-actuated, multi-store dispenser wherein an initial electrical charge ignites gas cartridges causing sequential launching of stores from their tandem position inside a launch container. In some environments, it is desirable to dispense multiple stores from a launch vehicle, for instance sonobuoys, in dense patterns. Due to physical limitations of space in the dispensing vehicle, an effort was made to miniaturize the active components inside the store and therefore reduce the overall outer dimensions thereof. Once the size of the store was reduced, in order to meet the demands of the denser patterns, the inside of the individual launch containers were modified to allow each to hold and dispense more than one store. This new type of launch container, in addition to maintaining the size requirement dictated by the transporting vehicle, is operated by the vehicle's electrical systems.

SUMMARY OF THE INVENTION

It is therefore an object of the present invention to provide from a standard-size launch container a multi-store launcher for launching, sequentially, a plurality of stores wherein said launcher is adaptable to presently existing transporting vehicles.

It is another object of the present invention to provide a multi-store launcher that is able to use electric pulses from the transporting vehicle to sequentially activate individual gas cartridges carried in the breech end of the launcher to launch each store.

It is still another object of the present invention to provide said multi-store launcher, which uses individual gas cartridges, without making significant alterations to the standard-size launch container.

These and other objects and advantages of the present invention are achieved by providing a standard size, tubular, launch container with a control module, a plurality of gas cartridges attached thereto and a plurality of sequentially stacked store assemblies. The container is connected into a standard port of a transporting aircraft and electric power sent to a control module. The control module sends the electric charge to individual squibs, each having varying turn resistors, which ignite gas-generating cartridges. The gas charge is channelled to one of a plurality of store assemblies and forces it out of the container at the discharge end. Further electric pulses to the control module causes the next turn resistor to fail and the process is repeated.

BRIEF DESCRIPTION OF THE DRAWINGS

FIG. 2 shows an enlarged cross-sectional view of the launch control module at the breech end;

FIG. 4 is a cross-sectional view of the control module taken along lines IV—IV of FIG. 2.

DETAILED DESCRIPTION OF THE PREFERRED EMBODIMENT

Figure 1:
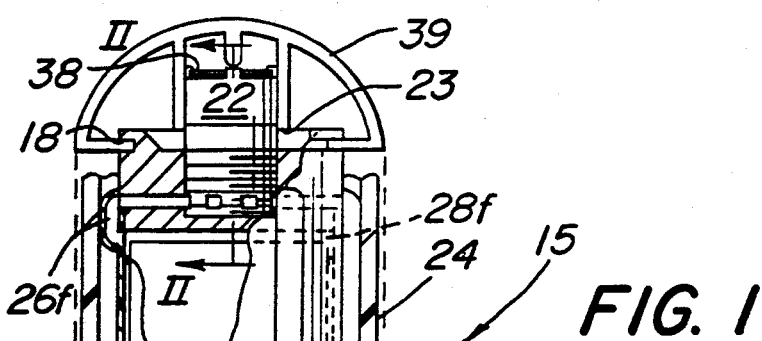
FIG. 1 shows a longitudinal view of a launch container with a partial cross-sectional view at the breech end.

Referring now to the several drawings, wherein like numerals refer to like parts, there is shown in FIG. 1 a longitudinal view of a launch container 15, with portions cut away to show greater detail, suitable for being removeably attached, as at flange 18, to a transporting vehicle, such as an aircraft (not shown) so as to dispense stores, such as sonobuoys, 20a-f, sequentially packaged therein, as will be described. Container 15 is comprised of an inner tubular shaped body 17 having a control module 22 centrally situated and removeably inserted at the breech end 23, and a plurality of flow channels 26a-f running from module 22 to unique, individual chambers 28a-f in the interior of container 15. Container 15 also has an outer housing skin 24 and tubular body 17, housing 24 and module 22 can all be made from PVC or ABS plastic, or other similar materials. Stores 20a-f are ejected, as will be described, through the discharge end 25.

Figure 3:
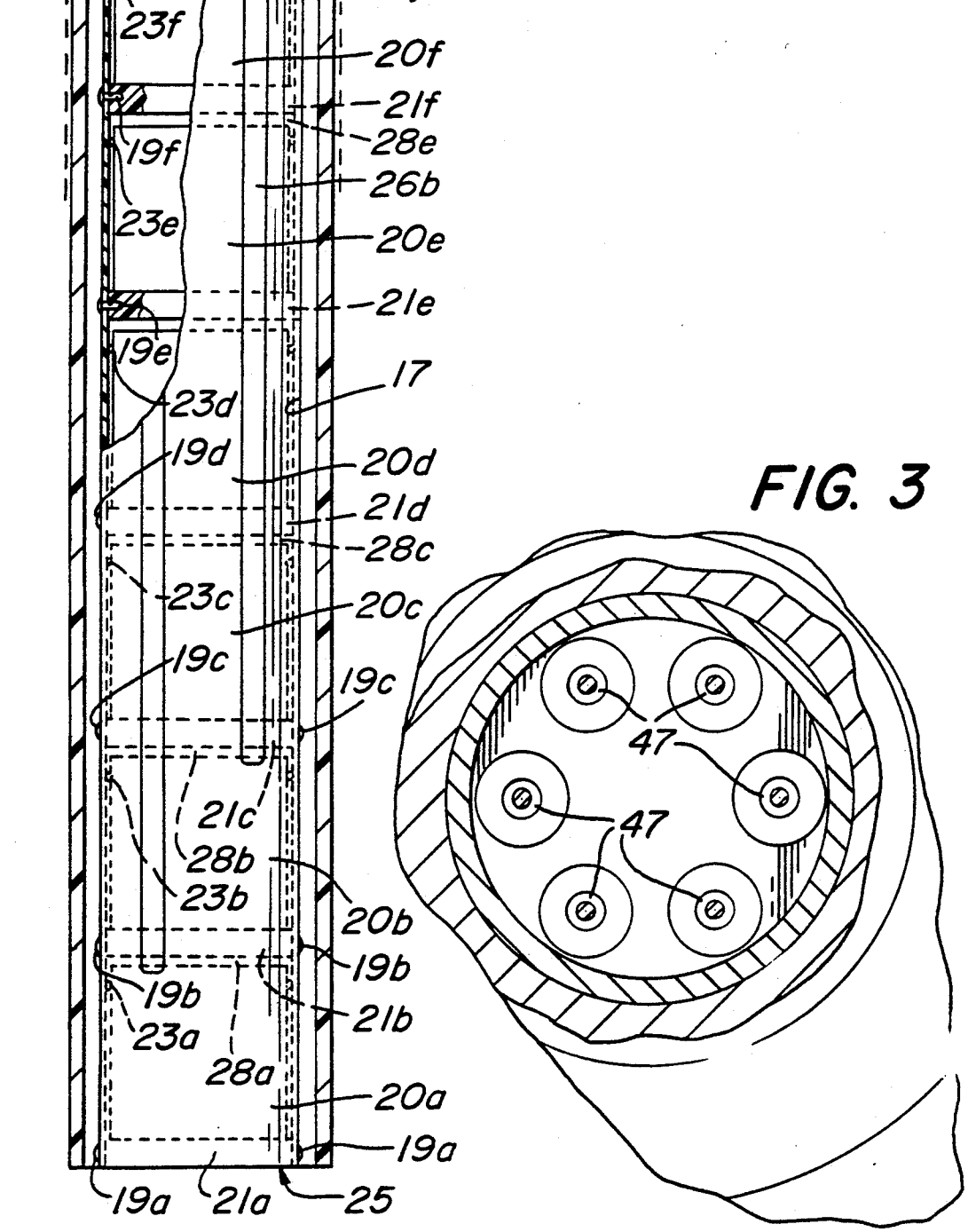
FIG. 3 is a cross-sectional view of the control module taken along lines III—III of FIG. 2.

FIGS. 2, 3 and 4 all show cross-sectional views of launch container 15 and control module 22, taken along lines II—II, III—III and IV—IV respectively. As can be seen in FIG. 2, module 22 is comprised of a lower section 22b, which is threadedly inserted into its central location (as at threads 31b), and an upper section 22a, which is threadedly attached to lower section 22b (as at threads 31a). The thread direction between 31a and 31b can be reversed, as is known, to ensure a solid construction when the parts are assembled.

Upper section 22a consists of a solid right circular cylinder with six electrically conducting leads 34a-f (only 34a and f shown in FIG. 2) set therein. Leads 34a-f each run from a copper contact 36 at the top of section 22a to a bottom contact 37 at the underside thereof. Additionally, a thin, metallic contact plate 38 is removeably secured to touch all contacts 36 as by snap-fitting it underneath rim 39.

Lower section 22b is also a right circular cylinder and has therein a plurality (only 42a and f shown in FIG. 2) of bores 42a-f therein, each leading to a separate passageway or channel 26a-f, respectively, as seen in FIGS. 3 and 4. Bores 42a-f each have, at a predetermined location, a ledge 44a-f ( only 44a and f shown in FIG. 2) projecting from the side walls, and a gas-charge generating propellant cartridge 45 is seated thereon. Cartridges 45 are available on the market from such companies as ICI Aerospace. Atop each cartridge 45 is placed a commercially available resistor 47. Resistors 47 have predetermined values, and all receive the firing pulse. As a pulse is received, the current follows the path of least resistance igniting the gas cartridge 45 with resistor 47 having the smallest resistance. As will be described, each succeeding resistor 47 is selected with a slightly greater resistance to provide the necessary selectability of gas charges.

OPERATION

The electrically-actuated multiple store launcher is packed with six store assemblies 20a-f by sliding, sequentially, a store, as surrounded by a sealing ring 23a-f, inserted in an associated grove, and a pressure plate 21a-f into unique locations adjacent a separate channel 26a-f inside container 15. Each assembly has a pair of shear pins 19a-f driven through appropriately spaced apertures in the walls of container 15, as seen in FIG. 1. Shear pins 19a-f are made according to predetermined specifications to fail at a prespecified pressure, the pressure generated by gas generating cartridges 45a-f.

An electric pulse of predetermined strength and duration is generated by the transporting vehicle and applied to plate 38. The current pulse is sent through copper contacts 36 and lower contacts 37 to resistors 47, or gating means, and the one with the lowest resistance allows the current to ignite the gas generating cartridge 45 adjacent thereto. This gas charge is carried by channel 26a where it exerts pressure on store 20a. Shear pins 19a, located on opposite sides of pressure plate 21a, will fail, as earlier described, and store 20a will be discharged. This sequence is repeated over with the next larger resistor 47 igniting its associated cartridge 45.

Finally, while the electrically-actuated multi-store launcher has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A multi-store launcher that uses electrical pulses to generate sufficient gas pressure to discharge, sequentially, store assemblies packed therein, comprising:
   a. a launch container for sequentially holding in unique chambers a plurality of stores and being removeably fastened to a transporting vehicle, and having at its breach end plate means to receive an electric pulse;
   b. control module means containing a plurality of resistors of varied values and gas charge generating cartridges connected to said means to receive the pulse and to change the electric pulse into a gas charge; and
   c. a plurality of flow means connecting said control module means to separate one of said unique chambers to channel the gas charge thereto.

2. A multi-store launcher as described in claim 1 wherein said container is tubular.

3. A multi-store launcher as described in claim 1 wherein said control module means comprises:
   a. an electric pulse transmitting;
   b. a plurality of pulse conducting leads connected thereto;
   c. a plurality of gating means connected to said leads to receive the electric pulse, and selectively transfer said pulse; and
   d. a plurality of propellant cartridges adjacent said gating means.

4. A multi-store launcher as described in claim 2 wherein said pulse receiving means is a metallic contact plate.

5. A multi-store launcher as described in claim 3 wherein said gating means comprises a plurality of resistors wherein each said resistor has a different, unique value.

6. A multi-store launcher as described in claim 3 wherein said flow means comprises a plurality of tubular passageways.

7. A multi-store launch that can be removeably fixed to a vehicle to receive an electrical pulse therefrom, comprising;
   a. a tubular launch container having a discharge end and an oppositely disposed breech end;
   b. a metal contact plate at the breech end;
   c. a plurality of pulse conducting leads;
   d. a plurality of resistors, connected to said leads, each having an increasingly higher value than the succeeding ones;
   e. a plurality of gas charge generating propellant cartridges connected thereto; and
   f. a flow tube leading from each said cartridge into the container.

* * * * *